(12) United States Patent
Koukouravas

(10) Patent No.: US 7,331,851 B2
(45) Date of Patent: Feb. 19, 2008

(54) MOTOR VEHICLE AIR-CONDITIONING SYSTEM

(75) Inventor: Evripidis Koukouravas, Neckartenzlingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/987,296

(22) Filed: Nov. 15, 2004

(65) Prior Publication Data

US 2005/0124283 A1 Jun. 9, 2005

(30) Foreign Application Priority Data

Nov. 13, 2003 (DE) ................. 103 53 191

(51) Int. Cl.
*B60H 1/02* (2006.01)
(52) U.S. Cl. .................................... 454/160
(58) Field of Classification Search ................ 454/152, 454/156, 159, 160, 161
See application file for complete search history.

(56) References Cited

U.S. PATENT DOCUMENTS

| | | | |
|---|---|---|---|
| 4,531,671 A * | 7/1985 | Schwenk | ............... 237/12.3 B |
| 4,852,638 A * | 8/1989 | Hildebrand et al. | .......... 165/42 |
| 5,462,483 A | 10/1995 | Loup | |
| 5,476,418 A | 12/1995 | Loup | |
| 6,007,421 A | 12/1999 | Schwarz | |
| 6,484,755 B1 * | 11/2002 | Schwarz | .................. 137/637.3 |
| 6,599,182 B1 * | 7/2003 | Schwarz | .................... 454/156 |
| 2001/0021635 A1 | 9/2001 | Akahane | |

FOREIGN PATENT DOCUMENTS

| | | |
|---|---|---|
| DE | 693 19 313 T2 | 6/1994 |
| DE | 44 07 424 A1 | 10/1994 |
| DE | 4407424 | 10/1994 |
| DE | 19501593 | 7/1995 |
| DE | 195 23 757 A1 | 1/1996 |
| DE | 197 57 280 A1 | 7/1998 |
| DE | 198 43 008 A1 | 4/1999 |
| DE | 19756166 | 6/1999 |
| EP | 0845375 | 6/1998 |

* cited by examiner

*Primary Examiner*—Steven McAllister
*Assistant Examiner*—Helena Kosanovic
(74) *Attorney, Agent, or Firm*—Foley & Lardner LLP

(57) ABSTRACT

A motor vehicle air-conditioning system (1), including a plurality of air ducts (7', 7") having a flap for controlling the air flow therein. A single flap (6) is provided for controlling at least two air ducts (7', 7") which serve for the temperature stratification of the air streams.

13 Claims, 5 Drawing Sheets

US 7,331,851 B2

MOTOR VEHICLE AIR-CONDITIONING SYSTEM

CROSS-REFERENCE TO RELATED PATENT APPLICATIONS

The right of foreign priority is claimed based upon Federal Republic of Germany Patent Application No. 103 53 191.2, filed Nov. 13, 2003, the entire disclosure of which, including the specification, drawings, claims and abstract, is incorporated herein by reference.

BACKGROUND OF THE INVENTION

The present invention relates to a motor vehicle air-conditioning system and more particularly to an improved air flow control mechanism for such a system.

In motor vehicle air-conditioning systems, use is conventionally made of two separately formed flaps for stratification of the air temperature, e.g., directing air selectively to the "central nozzle/footwell" and "central nozzle/side nozzles". Each flap has a dedicated stepping motor. As an alternative, a coupling of the two flaps is also possible, thus necessitating a stepping motor having correspondingly configured kinematics.

SUMMARY OF THE INVENTION

One object of the invention is to provide an improved air-directing arrangement for use in a motor vehicle air-conditioning system.

It is another object of the invention to provide a more cost-effective motor vehicle air-conditioning system.

Another object of the invention is to provide a vehicle having the improved air-conditioning system according to the invention.

In accomplishing these and other objects, there has been provided in accordance with one aspect of the present invention a motor vehicle air-conditioning system, comprising: a housing having a plurality of air ducts serving for stratifying the temperature of air streams directed to respective portions of an interior compartment of the vehicle; and an air flow control arrangement for selectively controlling the flow of air in each respective air duct, the air flow control arrangement comprising a single pivotable flap that controls the flow of air in at least two of the air ducts.

In accordance with another aspect of the present invention, there has been provided a motor vehicle having an air-conditioning system, wherein the air-conditioning system comprises an air-conditioning system as defined above.

Further objects, features and advantages of the present invention will become apparent from the detailed description of preferred embodiments that follows, when considered in connection with the accompanying figures of drawings.

DETAILED DESCRIPTION OF THE PREFERRED EMBODIMENTS

Figure 1:
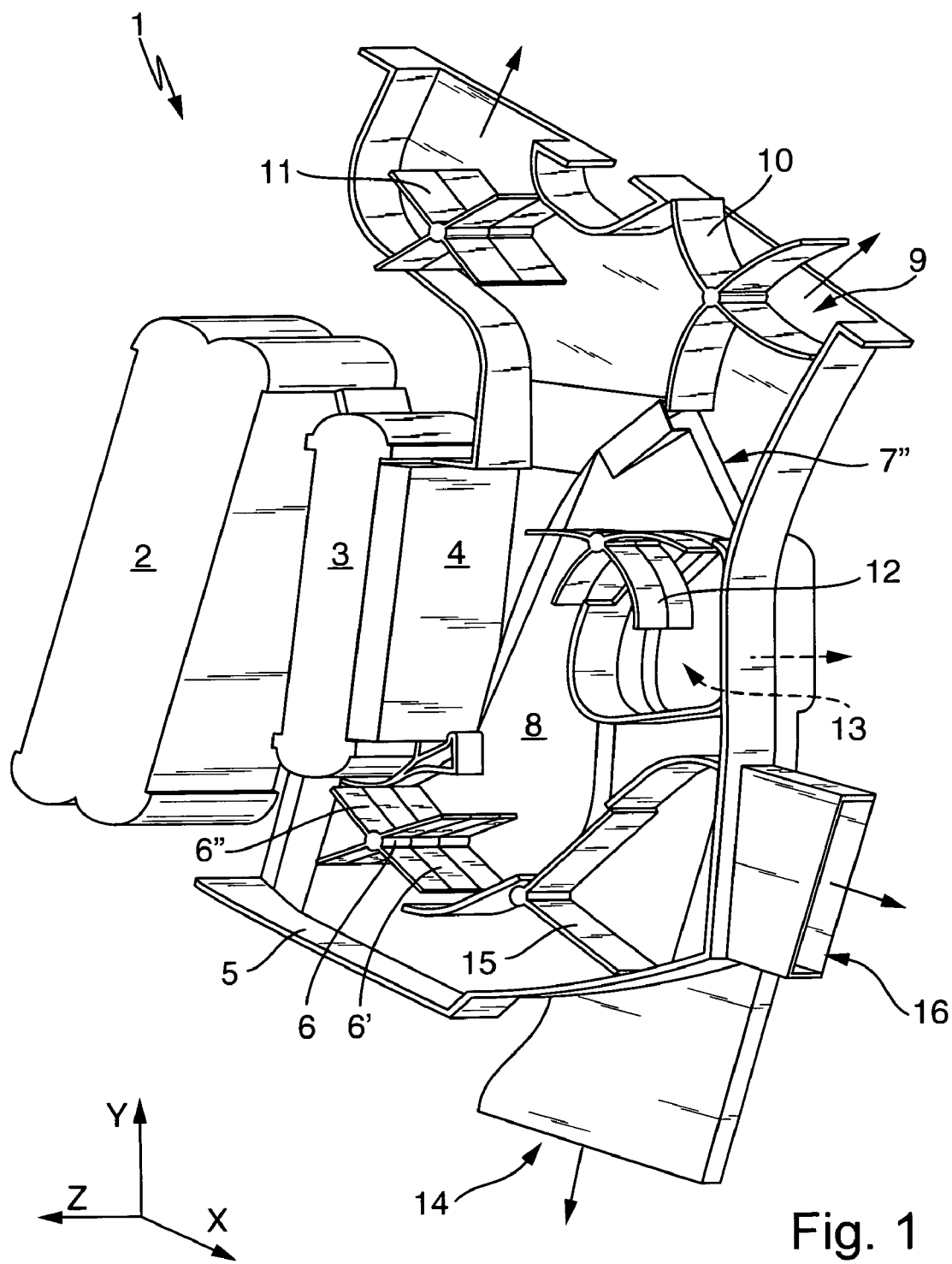
FIG. 1 is a cut-away, perspective illustration showing a motor vehicle air-conditioning system according to the invention with a flap arrangement.

The invention provides a motor vehicle air-conditioning system, in which a plurality of air ducts having a flap for controlling the air flow in the ducts are provided, wherein only a single flap is provided. This flap controls at least two air ducts which serve for the temperature stratification of the air streams. Owing to the fact that only one flap is required which controls a plurality of air ducts, only one drive, preferably a stepping motor, is required. Thus, costs can be saved. The air ducts are preferably brought together or converge at a point arranged downstream of the flap in the direction of air flow, with the result that the stratified air can be supplied to the vehicle interior.

The flap is preferably of multipart design, with the individual regions of the flap being connected rigidly to each other. For this purpose, slots may be provided in an otherwise continuous surface, for accepting walls of the air-guiding housing in the installed state of the flap.

The flap, preferably at least with regard to the regions of the flap, is of axially symmetrical design with respect to the central plane of the pivot axis, as a result of which the configuration of the air-conditioning system is simplified.

Turning now to the drawings, a motor vehicle air-conditioning system 1 has an evaporator 2 and a heater 3 with a supplementary heater 4, which are arranged in an air-guiding housing 5. The air-guiding housing 5 is designed for the stratified temperature control of the air, preferably vertically stratified such that air can be blown in separately and at different temperatures in zones arranged horizontally one above another, such as the footwell, the upper body region and the head region. In this way, the quantity of air in the air stream that is conducted through the evaporator 2 and guided past (bypass) the heater 3 with the supplementary heater 4 can be changed depending on the position of the flap 6, wherein any desired intermediate positions of the flap 6 is possible, e.g., with use of a stepping motor 17 as the drive. In this connection, the air flow can be divided between three ducts, namely, the cold air bypass 7' (region 6' of the flap 6) and the left and right stratification ducts 7". Cold air can be guided through the stratification ducts 7" (regions 6" of the flap 6) in a specific manner to the central and side nozzle (ventilation air duct 9 with ventilation flap 10) without cold air passing into the mixing chamber 8, or by the air streams being brought together, so that a stratified air flow is formed.

The temperature-controlled air can also pass from the mixing chamber 8 via the defroster flap 11 into the air duct leading to the windshield. Furthermore, the temperature-controlled air can pass from the mixing chamber 8 into the ventilation air duct 9 to the central and side nozzle via the ventilation flap 10, to the front footwell via the footwell flaps 12 (via the air duct 13) and into the rear footwell (via the air duct 14) and into the air duct 16, which serves to ventilate the rear, via the temperature flap 15. In this case, the temperature flap 15 makes it possible to lower the temperature by adding cold air which comes directly from the evaporator 2.

Figure 2:
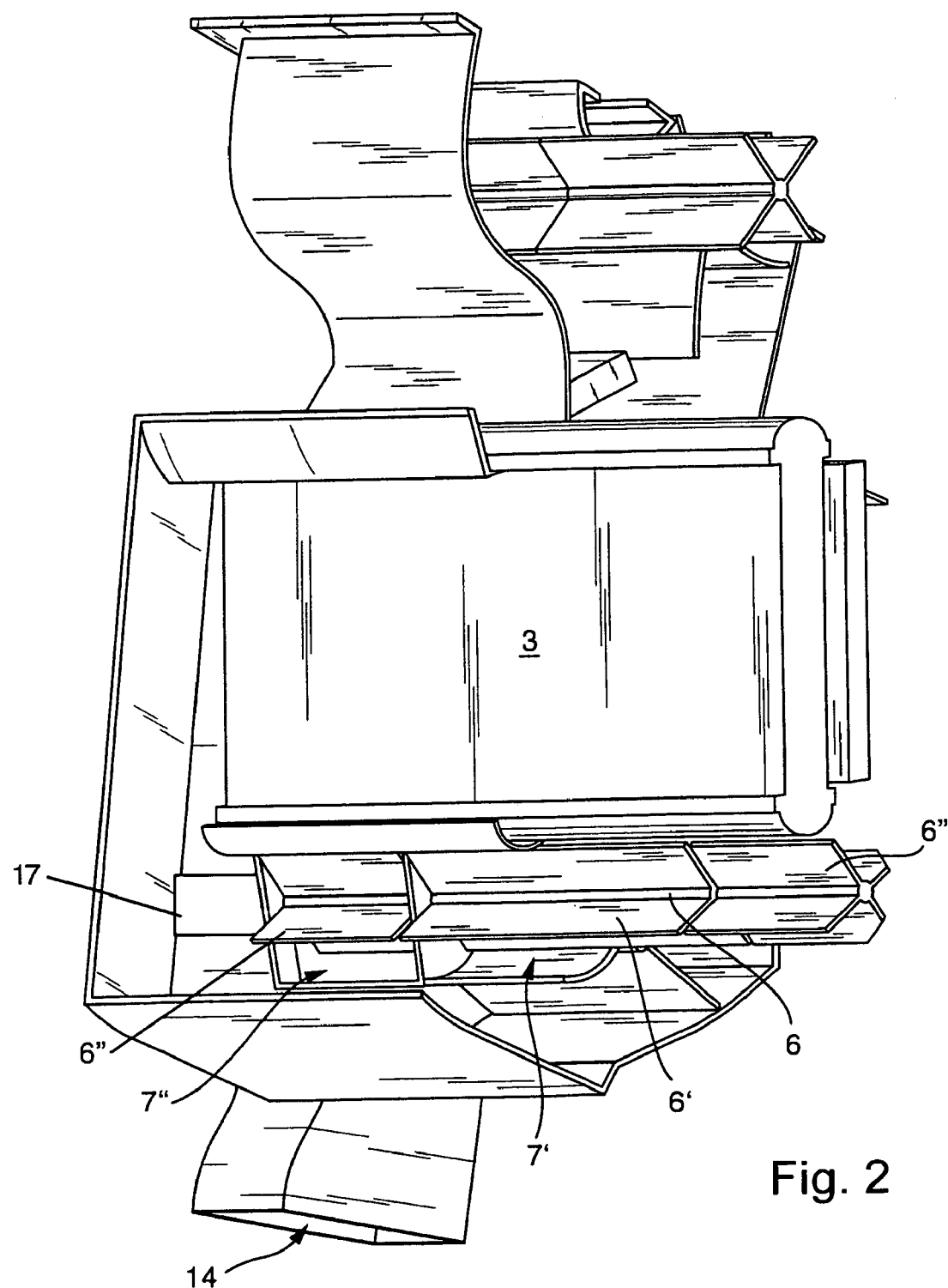
FIG. 2 is a perspective view showing the cut-away air-conditioning system of FIG. 1 from a different perspective, but without the evaporator.
Figure 3A:
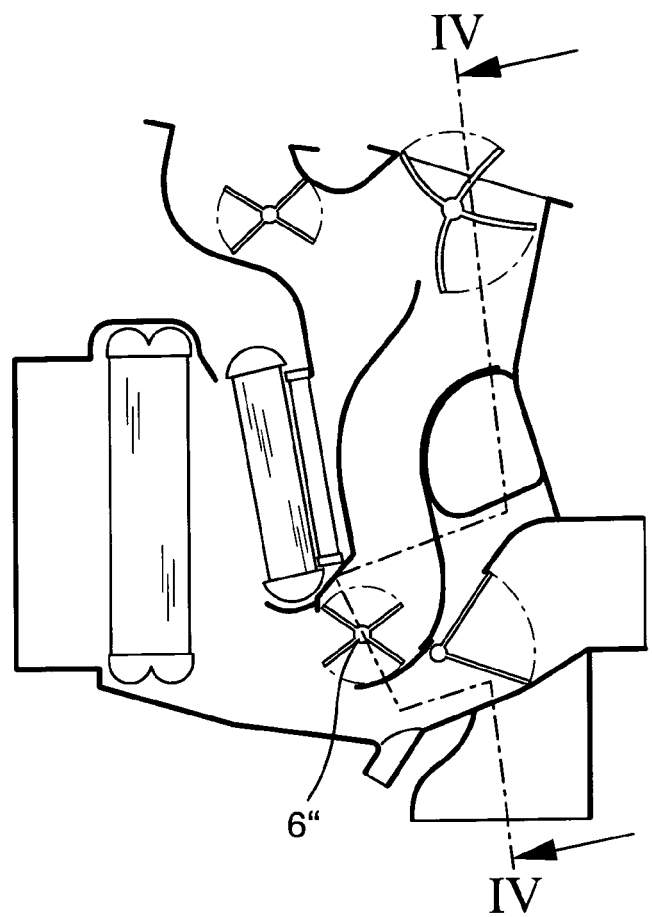
FIG. 3a is a cross-sectional view taken through a stratification duct of the air-conditioning system of FIG. 1.
Figure 3B:
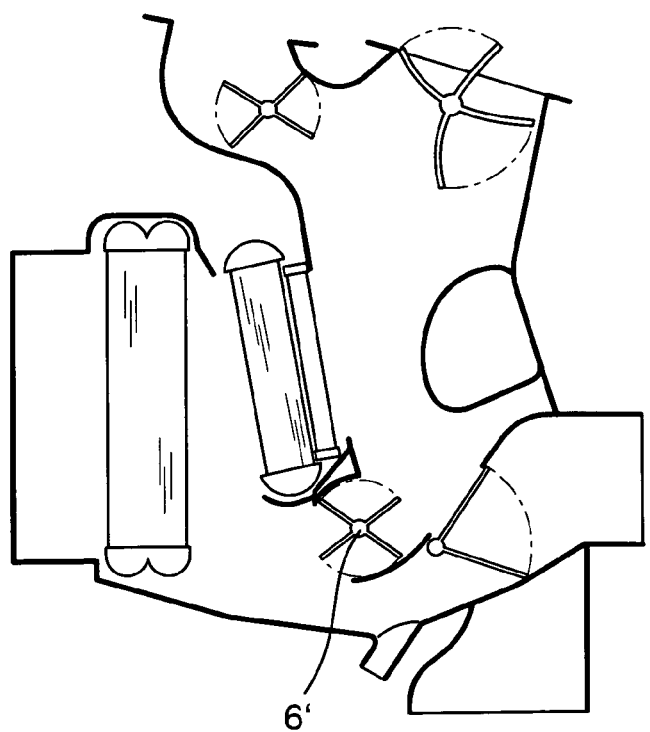
FIG. 3b is a cross-sectional view taken through a cold air bypass of the air-conditioning system of FIG. 1.
Figure 4:
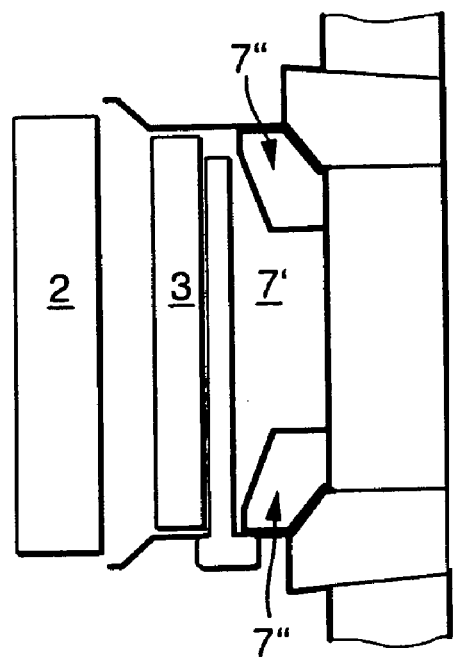
FIG. 4 is a cross-sectional view taken along line IV-IV in FIGS. 3a and 3b.

Owing to the multipart configuration of the flap 6, which is also arranged in different housing regions (cf. FIG. 2), namely in the cold air bypass 7' and the two stratification ducts 7", this flap 6 may also be referred to as a flap arrangement with the individual regions of the flap 6 being connected rigidly to each other. The flap 6 is driven by a single stepping motor 17, illustrated schematically.

In the case of a single-zone air-conditioning system, as previously described, the flap 6 is designed as a single member and is merely slotted in the region of the flanks for receiving the partitions. In the case of a two-zone air-conditioning system, the flap is divided centrally (cf. FIG. 5), i.e., it is designed as two members, and partitions are provided to separate the air streams of the two zones. To drive a two-part flap of this type, two stepping motors 17, 17' are provided, i.e., one stepping motor per flap half. Preferably, the two flaps have the same pivot axis.

Figure 6:
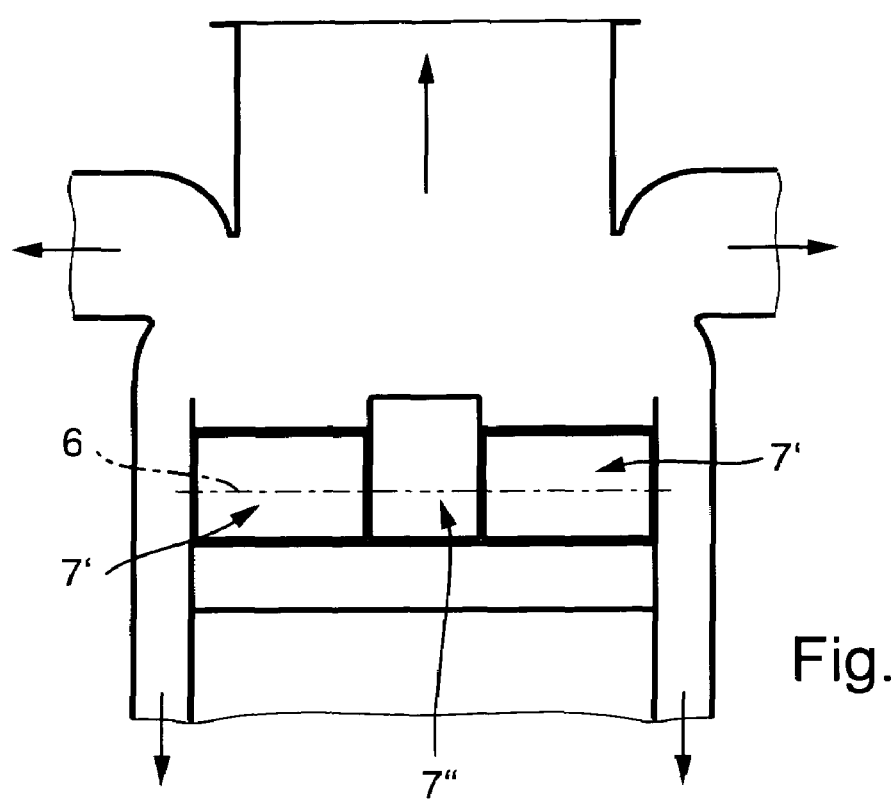
FIG. 6 is a view showing a variant.
Figure 7:
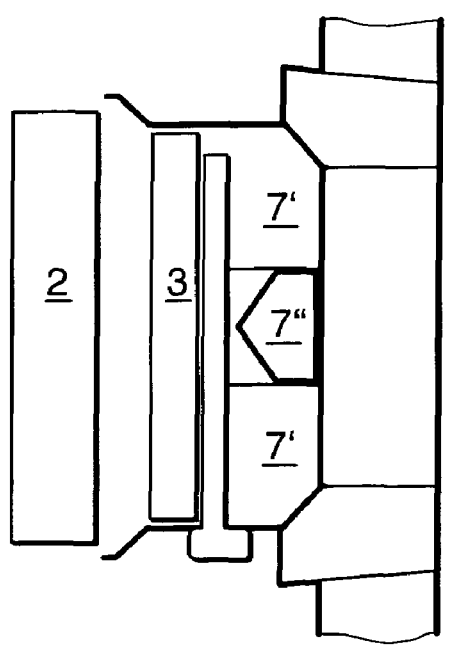
FIG. 7 is an illustration corresponding to FIG. 4 showing the variant of FIG. 6.

FIGS. 6 and 7 show a variant having a centrally arranged stratification duct 7" and two cold air bypasses 7' arranged on the outside. In this case, too, all of the ducts 7' and 7" are controlled by a single flap 6 which is of continuous design.

Figure 5:
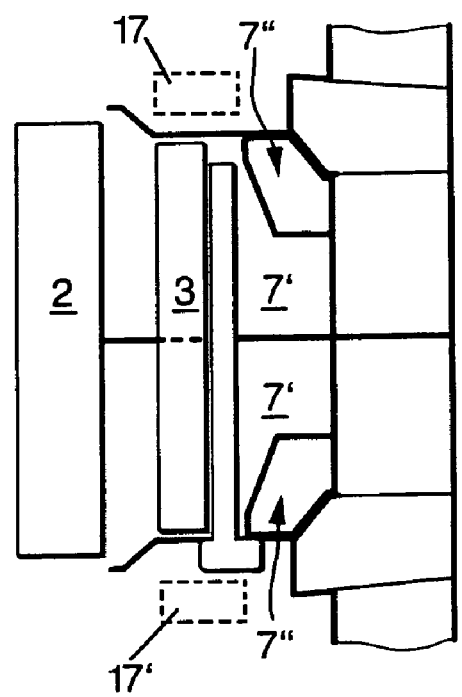
FIG. 5 is an illustration corresponding to FIG. 4 of a two-zone air-conditioning system.

According to a further variant, in the case of a corresponding, two-zone air-conditioning system, the flap 6 is divided centrally and two drives and partitions are provided, as described with reference to FIG. 5.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A motor vehicle air-conditioning system, comprising:
   a housing having a mixing chamber and a plurality of air ducts serving for stratifying the temperature of air streams directed to respective portions of an interior compartment of the vehicle, wherein the plurality of air ducts comprises at least first and second ducts for guiding air into the mixing chamber before exiting into a first output duct and at least a third duct for guiding air directly into a second output duct by bypassing the mixing chamber; and
   an air flow control arrangement for selectively controlling the flow of air in each respective air duct,
   wherein the air flow control arrangement comprises a single pivotable flap that controls the flow of air in at least the first and third air ducts, and
   wherein the single pivotable flap is configured such that the flow of air can be prevented from flowing through the third air duct by the single pivotable flap.

2. A motor vehicle air-conditioning system according to claim 1, wherein the plurality of air ducts comprises at least two air ducts that converge together at a point arranged downstream of the flap in the direction of air flow.

3. A motor vehicle air-conditioning system according to claim 1, wherein the flap comprises multiple portions defining individual regions of the flap, and wherein the individual regions are connected rigidly to each other.

4. A motor vehicle air-conditioning system according to claim 3, wherein the individual regions of the flap are separated by a slot.

5. A motor vehicle air-conditioning system according to claim 1, wherein the flap is of axially symmetrical design with respect to the central plane of the pivot axis.

6. A motor vehicle air-conditioning system according to claim 1, wherein the third duct is a cold air bypass.

7. A motor vehicle air-conditioning system according to claim 1, wherein the first duct is a stratification duct.

8. A motor vehicle air-conditioning system, comprising:
   a housing having a mixing chamber and a plurality of air ducts serving for stratifying the temperature of air streams directed to respective portions of an interior compartment of the vehicle, wherein the plurality of air ducts comprises at least first and second ducts for guiding air into the mixing chamber before exiting into a first output duct and at least a third duct for guiding air directly into a second output duct by bypassing the mixing chamber; and
   an air flow control arrangement for selectively controlling the flow of air in each respective air duct,
   wherein the air flow control arrangement comprises a single pivotable flap that controls the flow of air in at least the first and third air ducts,
   wherein said third air duct is a cold air bypass arranged centrally between the first air duct and the second air duct.

9. A motor vehicle air-conditioning system according to claim 1, further comprising a motor for driving the flap.

10. A motor vehicle air-conditioning system according to claim 1, wherein the air-conditioning system comprises a two-zone air-conditioning system, wherein for each zone the system includes a plurality of air ducts comprising at least one cold air bypass and at least one stratification duct.

11. A motor vehicle air-conditioning system according to claim 1, wherein the flap has a single pivot axis.

12. A motor vehicle comprising:
    an air-conditioning system, wherein the air-conditioning system comprises:
    a housing having a mixing chamber and a plurality of air ducts serving for stratifying the temperature of air streams directed to respective portions of an interior compartment of the vehicle, wherein the plurality of air ducts comprises at least first and second ducts for guiding air into the mixing chamber before exiting into a first output duct and at least a third duct for guiding air directly into a second output duct by bypassing the mixing chamber; and
    an air flow control arrangement for selectively controlling the flow of air in each respective air duct,
    wherein the air flow control arrangement comprises a single pivotable flap that controls the flow of air in at least the first and third air ducts, and
    wherein the single pivotable flap is configured such that the flow of air can be prevented from flowing through the third air duct by the single pivotable flap.

13. A motor vehicle air-conditioning system according to claim 8, wherein the first and second air ducts are two stratification ducts.

* * * * *